United States Patent [19]

Ludwig

[11] Patent Number: 5,269,148
[45] Date of Patent: Dec. 14, 1993

[54] REFRIGERANT RECOVERY UNIT

[75] Inventor: Dale V. Ludwig, Fort Worth, Tex.

[73] Assignees: Hans E. Brandt, Hurst, Tex.; James D. Ludwig, St. Petersburg, Fla.; part interest to each

[21] Appl. No.: 940,650

[22] Filed: Sep. 4, 1992

[51] Int. Cl.$^5$ .............................................. F25B 45/00
[52] U.S. Cl. ......................................... 62/77; 62/292; 62/149
[58] Field of Search ...................... 62/77, 85, 149, 292, 62/475

[56] References Cited

U.S. PATENT DOCUMENTS 5,172,562  12/1992  Manz et al. ........................... 62/292
5,189,881  3/1993  Miles ..................................... 62/292

Primary Examiner—John M. Sollecito
Attorney, Agent, or Firm—James F. Bradley

[57] ABSTRACT

A refrigerant recovery unit for large refrigerant systems has a suction compressor which withdraws vapor and a liquid pump which withdraws liquid refrigerant. The compressor and liquid pump pass the fluids to a heat exchanger and a condenser, both located within a bath of chilled liquid. The vapor condenses into a liquid and combines with the liquid refrigerant. The liquid passes to a storage tank. A feedback compressor withdraws vapor from the upper portion of the tank if the pressure is above a selected level and passes it to the condenser for further condensation. A bypass line directs refrigerant vapor to the inlet of the feedback compressor if the tank vapor pressure is below the selected level. A drawdown line allows the feedback compressor to draw all of the refrigerant from the recovery unit after the recovery unit has recovered the refrigerant from the refrigeration system.

19 Claims, 2 Drawing Sheets

REFRIGERANT RECOVERY UNIT

BACKGROUND OF THE INVENTION

1. Field of the Invention:

This invention relates in general to equipment for recovering refrigerant, and in particular to equipment for recovering large quantities of refrigerant.

2. Description of the Prior Art:

In the past, large quantities of CFC refrigerants were vented to the atmosphere when the unit utilizing the refrigerants needed to be repaired or decommissioned. Subsequently, it was learned that the refrigerants lead to depletion of the ozone layer. Now it is prohibited to vent refrigerants to atmosphere.

Recovery units currently in use normally have a compressor, evaporator and a condenser. Vapor refrigerant is drawn into the compressor, which pressurizes the vapor and forwards it to the condenser. The vapor condenses into a liquid in the condenser, and from there it passes to the storage bottle. Liquid refrigerant withdrawn from the system passes through an expansion valve which drops the pressure, causing it to vaporize. The vaporized cold refrigerant passes through an evaporator which removes heat, and from there the vapor passes to the suction side of the compressor.

While these systems work well enough for small quantities of refrigerant removal, they normally will not handle very high flow rates. Consequently in large commercial air conditioning or refrigeration units, removing the refrigerant is very time consuming. The small units are not be able to accommodate the necessary heat exchange during the evaporating and condensing steps.

SUMMARY OF THE INVENTION

The apparatus of this invention is particularly useful for removing large quantities of refrigerant quickly. The apparatus includes a suction unit which may be wheeled or rolled into a building for positioning next to the refrigeration unit. The assembly also includes a truck-mounted unit remotely connected to the suction unit by hoses.

The suction unit has a suction compressor which draws vapor from the refrigerant system. The suction unit also has a liquid pump which will pump out liquid refrigerant. The suction compressor and liquid pump transmit the liquid and vapor refrigerant over lines to a bath of chilled liquid in the truck.

A condenser is immersed in the bath for condensing refrigerant vapor flowing from the suction compressor. A heat exchanger is also located in the bath in communication with the liquid pump for cooling the liquid refrigerant. The refrigerant passes from the glycol bath into a storage tank.

Also, a feedback line leads from the vapor port of the tank to a feedback compressor located in the truck unit. When the tank pressure is above a selected level, the feedback compressor withdraws vapor from the upper portion of the tank and applies it back to the condenser for further condensation. If the tank pressure is below the selected level, a valve directs part of the outlet of the suction compressor through a bypass line to the inlet of the feedback compressor. The compressors act in tandem when the tank pressure is below the selected level.

The system has a drawdown line and valves which will allow the feedback compressor to evacuate all of the lines and equipment from the recovery unit after the recovery has been completed.

DETAILED DESCRIPTION OF THE INVENTION

Figure 1:
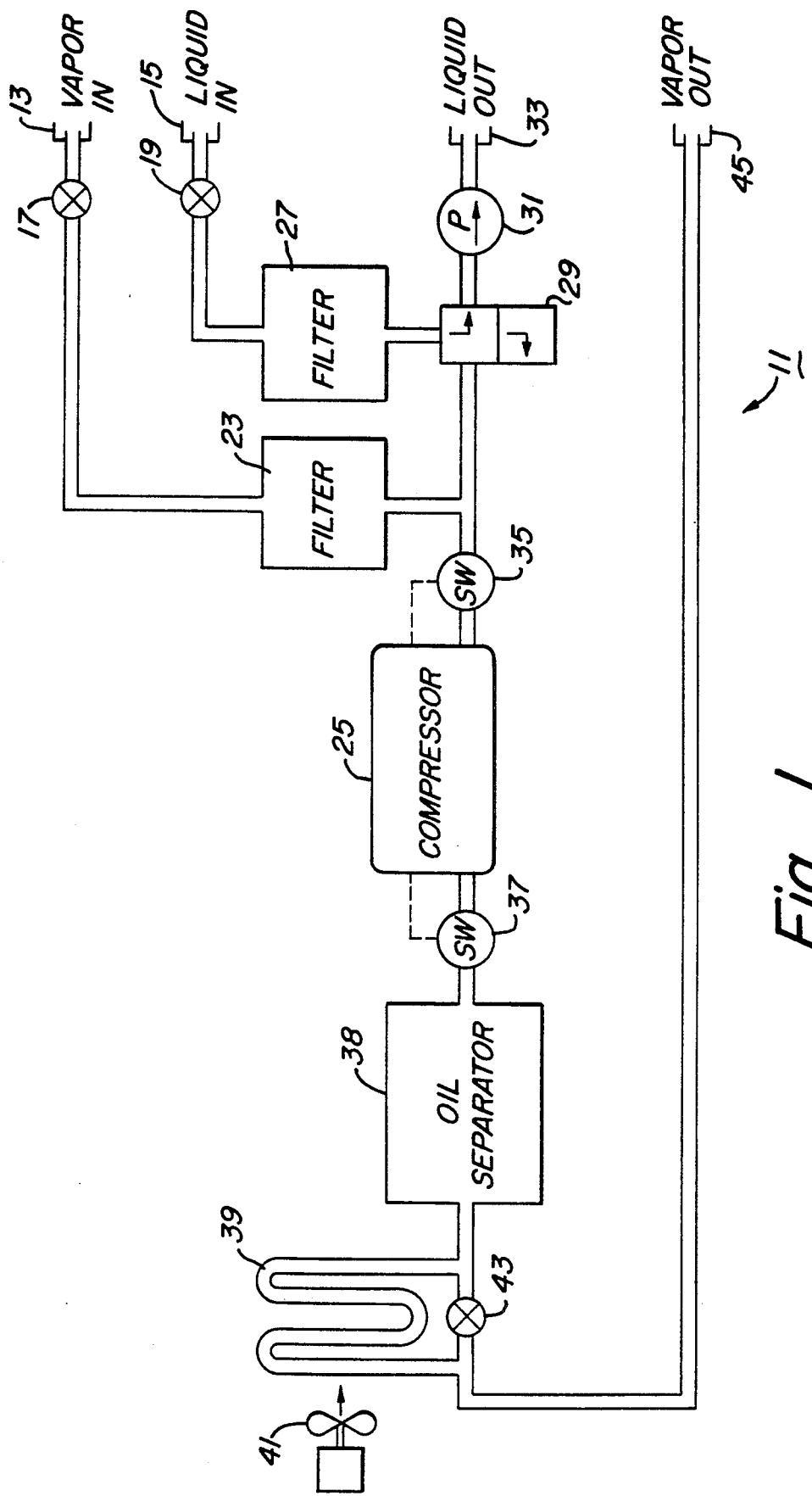
FIG. 1 is a schematic view illustrating a suction unit constructed in accordance with this invention.

Referring to FIGS. 1, suction unit 11 will be mounted on a cart so that it can be rolled into a building for positioning next to a refrigeration unit. Suction unit 11 has a low pressure intake 13 and a high pressure intake 15. Intakes 13, 15 comprise connections that will connect into the refrigeration unit at points for receiving vapor and liquid refrigerant, respectively, contained in the refrigeration system. Valves 17, 19 will selectively open and close the lines leading from the low pressure intake 13 and high pressure intake 15. A filter or strainer 23 will filter the refrigerant vapor. The vapor is drawn in low pressure intake 13 by means of a suction compressor 25 connected downstream of filter 23.

A filter 27 connects to the high pressure intake 15. Liquid refrigerant flows through a valve 29 to a positive displacement liquid pump 31. Liquid will flow out a liquid conduit 33. Valve 29 can be switched to direct flow from high pressure port 15 to suction compressor 25 rather than liquid pump 31 when all of the liquid refrigerant has been withdrawn.

Compressor 25 has conventional pressure switches 35, 37 which are connected with compressor 25 for cutting off compressor 25 in the event of excessively high or low pressure. The vapor flows from the outlet of compressor 25 through an oil separator 38 for removing oil droplets contained in the refrigerant vapor. The vapor flows from oil separator 38 optionally through a precooler 39. Precooler 39 is similar in configuration to a serpentine condenser, although it does not normally condense any vapor. An electric fan 41 blows air through the coils of precooler 39 to assist in removing heat from the compressed refrigerant vapor. A valve 43 when closed forces all of the vapor through precooler 39. In the event of low ambient temperature, valve 43 may be opened, allowing vapor to bypass precooler 39. The refrigerant leaves precooler 39 as a warm vapor, flowing through a vapor conduit 45.

Figure 2:
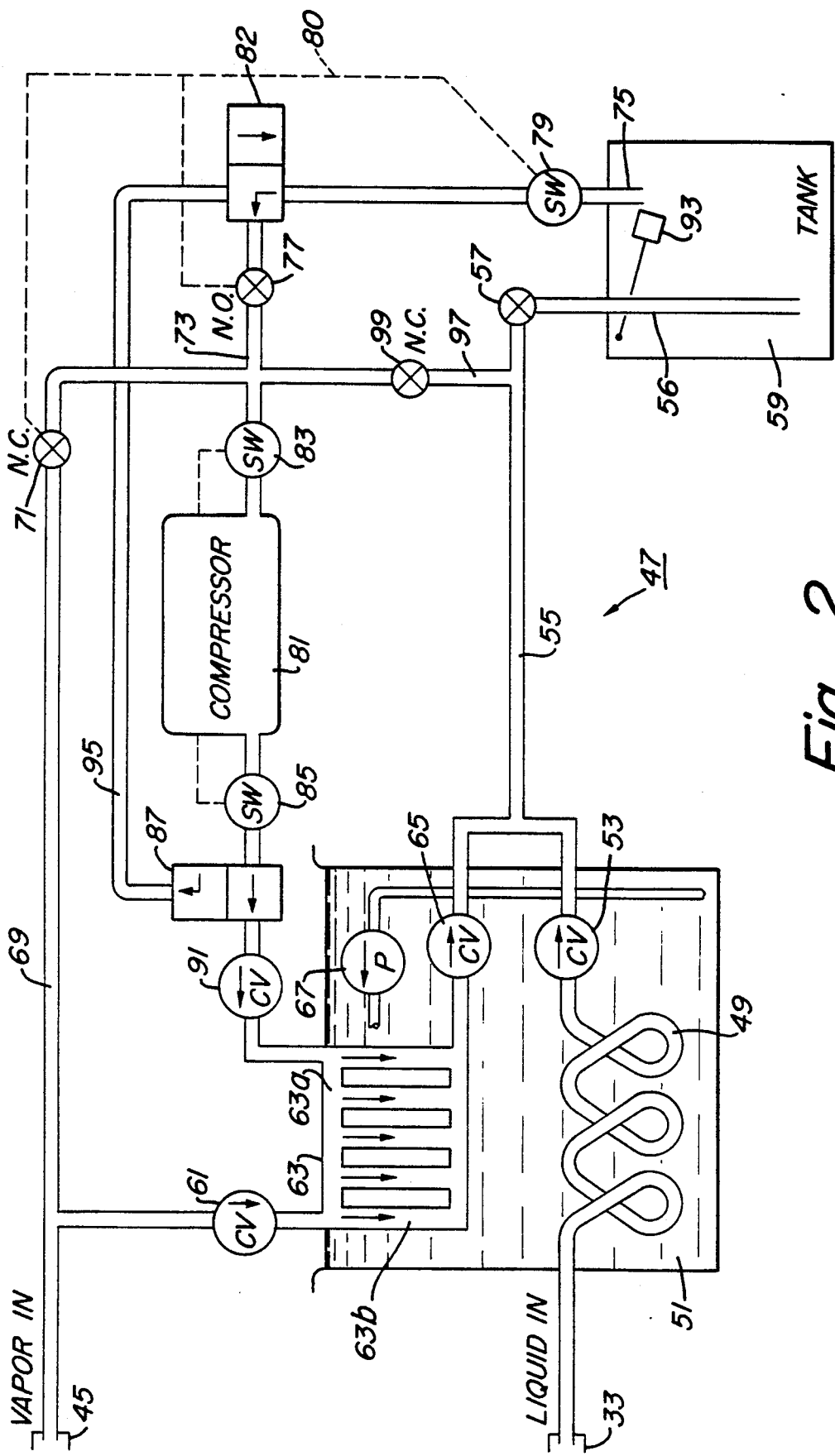
FIG. 2 is a schematic view illustrating a truck-mounted unit for use with the suction unit of FIG. 1 and constructed in accordance with this invention.

Conduits 33 and 45 are flexible hoses which lead to a truck mounted unit 47, illustrated in FIG. 2. Suction unit 11 will be located remote from truck mounted unit 47, possibly several hundred feet away and connected only by the conduits 33, 45.

Truck mounted unit 47 has a heat exchanger 49 connected to the liquid conduit 33. Heat exchanger 49 is a helical coil located within a bath 51 of chilled liquid, such as glycol. The liquid refrigerant in heat exchanger 49 will be cooled by the glycol in bath 51. A check valve 53 connects to the downstream side of heat exchanger 49, allowing refrigerant to flow out into a liquid line 55. The refrigerant flows through a normally open liquid valve 57 and into a liquid port 56 in a storage tank 59.

The vapor flowing through vapor conduit 45 passes through a check valve 61 and from there to a parallel flow condenser 63. Condenser 63 is also immersed in the glycol bath 51. Condenser 63 has parallel headers 63a connected by a plurality of tubes 63b, which are parallel to each other and perpendicular to headers 63a. The refrigerant is condensed in the condenser 63 and flows through a check valve 65 into the liquid line 55. A recirculating pump 67 located in he glycol bath 51 will circulate and discharge glycol through the fins (not shown) mounted to tubes 63b of the condenser 63 to facilitate heat exchange.

A bypass line 69 joins vapor conduit 45 at the upstream side of condenser 63 and extends to the inlet line 73 of a feedback compressor 81. A normally closed bypass valve 71 blocks flow through bypass line 69 unless open. Feedback compressor 81 is a conventional refrigerant compressor, having protective low and high pressure switches 83, 85. When bypass valve is open, some of the refrigerant vapor from vapor conduit 45 passes directly to the inlet line 73 of feedback compressor 81. Feedback compressor 81 further increases the pressure, and passes the vapor through a drawdown valve 87 and a check valve 91 to the condenser 63.

The inlet line 73 of feedback compressor 81 has a normally open vapor port valve 77. Inlet line 73 joins a vapor port or line 75. Vapor port 75 extends into the upper portion of tank 59. A pressure switch 79 is located in the vapor port 75 to monitor the vapor pressure in the upper portion of the tank 59. Switch 79 electrically controls bypass valve 71 and vapor port valve 77 through electrical line 80. A drawdown valve 82 locates between switch 79 and valve 77.

When the pressure sensed by switch 79 is below a selected level, vapor port valve 77 is closed, blocking flow out of vapor port 75. Bypass valve 71 will be open when the pressure is below the selected level. A preferred selected level is 10 to 20 psi. When the pressure is above the selected level, switch 79 positions vapor port valve 77 in the open position, connecting vapor port 75 to the inlet line 73 of feedback compressor 81. When at or above the selected level, switch 79 positions bypass valve 71 in the closed position.

Tank 59 has a conventional float valve 93 which will monitor the level of liquid. Float valve 93 will close liquid valve 57 when tank 59 is full.

After the refrigeration system has been evacuated, it will be necessary to withdraw refrigerant from the various lines and components of the suction unit 11 and truck mounted unit 47. The drawdown components include a pressure drawdown line 95 which leads from drawdown valve 87. Valve 87 has one position which directs the output of compressor 81 through pressure drawdown line 95 and back into the vapor line 75. Drawdown valve 82, which locates at the junction of pressure drawdown line 95 and vapor port 75, has one position that directs flow from drawdown line 95 back into vapor port 75. The other position of drawdown valve 82 directs the flow of vapor out of vapor port 75 to the inlet line 73 of feedback compressor 81. A drawdown suction line 97 extends from the liquid port 56 of tank 59 to line 73 at the intake of feedback compressor 81. A normally closed drawdown valve 99 will open drawdown suction line 97 during the drawdown procedure.

In operation, the operator will place suction unit 11 adjacent the refrigeration system. The operator will connect the low pressure intake 13 to a point in the refrigeration system for receiving vapor, such as the inlet of the refrigeration system compressor. The high pressure intake 15 will be connected to a point in the refrigeration system for receiving liquid, such as at the receiver of the refrigeration system. The operator connects the liquid and vapor conduits 33, 45 from the suction unit 11 to the truck mounted unit 47. All of the lines and components of the suction unit 11 and truck mounted unit 47 will be initially evacuated.

Initially, the operator will withdraw the liquid refrigerant from the system by turning on liquid pump 31. Valve 29 will be in the position shown. The liquid will flow through filter 27 and through the liquid conduit 33. Referring to FIG. 2, the liquid flows through the heat exchanger 49, cooling the liquid. The liquid flows through liquid line 55 and into the liquid port 56 of storage tank 59.

Once the liquid refrigerant has been withdrawn, the operator will then turn on suction compressor 25 to withdraw vapor and pass it through the precooler 39 and out the vapor conduit 45 as a warm, high-pressure vapor. The operator may switch valve 29 to the opposite position shown, so as to withdraw through liquid intake 15 any vapor left in the high pressure side of the refrigeration system. The vapor flows through vapor conduit 45 to truck mounted unit 47.

Referring to FIG. 2, vapor from vapor conduit 45 will flow through condenser 63 where it condenses and flows as a liquid into liquid line 55. The condensed liquid flows into tank 59. Feedback compressor 81 will be continuously running. Initially the vapor pressure in tank 59 will likely be above the selected level because of vaporization of some of the liquid refrigerant that has been stored in tank 59. If so, bypass valve 71 will be closed and vapor port valve 77 will be open. Vapor will flow from tank 59 to the inlet line 73 of feedback compressor 81, which compresses the vapor and transmits it through valves 87, 91 to condenser 63. Condenser 63 condenses the vapor, which flows into liquid line 55 and tank 59.

The vapor pressure in tank 59 may drop below the selected level due to the suction of feedback compressor 81. If below the selected level, pressure switch 79 will cause vapor port valve 77 to close and bypass valve 71 to open. Some of the vapor flowing from conduit 45 will now flow through bypass line 69 to inlet line 73 of feedback compressor 81, which now acts in tandem with suction compressor 25, further increasing the pressure. The vapor flows through the outlet through valve 87 and into condenser 63, where it will be condensed into a liquid. The condensed liquid flows through check valve 65, liquid line 55 and into liquid port 56. The vapor pressure in tank 59 may be above and below the selected level several times during a recovery process. Feedback compressor 81 when withdrawing vapor from tank 59 prevents excessive pressure in tank 59, which otherwise would restrict the flow rate of liquid into liquid port 56.

Once all of the refrigerant has been withdrawn, the system will be placed in a drawdown mode to evacuate its lines and components of refrigerant. This is handled by opening drawdown valve 99, closing liquid valve 57, switching drawdown valve 82 to the opposite position shown, and switching drawdown valve 87 to the opposite position shown. Feedback compressor 81 will be running. Vapor in the conduits 33, 45, condenser 63, heat exchanger 49 and the various other components, will pass through liquid line 55 as a vapor and be drawn through the valve 99 to the inlet line 73 of feedback compressor 81. Feedback compressor 81 will compress the vapor and pass it through drawdown line 95 and valve 82 into the vapor port 75. Once all of the lines have been evacuated, valves 99, 87, and 82 will be moved back to the positions shown and feedback compressor 81 turned off.

The invention has significant advantages. The submersion of the heat exchanger and condenser in a glycol bath greatly facilitates the flow rate. The feedback compressor reduces pressure due to vapor in the tank, to allow a high flow rate of liquid into the tank to be maintained. The drawdown components allow the recovery unit itself to be evacuated of refrigerant.

While the invention has been shown in only one of its forms, it should be apparent to those skilled in the art that it is not so limited but is susceptible to various changes without departing from the scope of the invention.

I claim:

1. A refrigerant recovery apparatus for recovering refrigerant from a unit which utilizes refrigerant and has a low pressure port and a high pressure port, comprising in combination:
   vapor intake means for connecting to the low pressure port of the unit;
   liquid intake means for connecting to the high pressure port of the unit;
   suction compressor means having an outlet and having an inlet in communication with the vapor intake means for withdrawing refrigerant vapor from the unit;
   liquid pump means having an outlet and having an inlet in communication with the liquid intake means for withdrawing liquid refrigerant from the unit;
   a bath of chilled liquid;
   condenser means located in the bath and in communication with the outlet of the suction compressor means for condensing refrigerant vapor flowing from the suction compressor means;
   heat exchanger means located in the bath and in communication with the outlet of the liquid pump means for cooling the liquid refrigerant flowing from the liquid pump means; and
   a storage tank having a liquid port connected to the condenser means and to the heat exchanger means for storing liquid refrigerant flowing from the condenser means and the heat exchanger means.

2. The apparatus according to claim 1, further comprising:
   a vapor port in an upper portion of the tank; and
   feedback means leading from the vapor port of the tank to the condenser means for withdrawing vapor from the upper portion of the tank and returning it to the condenser means for further condensing.

3. The apparatus according to claim 1, further comprising:
   a vapor port in an upper portion of the tank;
   feedback compressor means connected to the vapor port of the tank and to the condenser means for withdrawing and increasing the pressure of vapor withdrawn from the upper portion of the tank and returning the increased pressure vapor to the condenser means for further condensing.

4. The apparatus according to claim 1 wherein the heat exchanger means comprises a coil of conduit immersed in the bath.

5. The apparatus according to claim 1 wherein the condenser means comprises a parallel flow condenser immersed in the bath.

6. A refrigerant recovery apparatus for recovering refrigerant from a unit which utilizes refrigerant and has a low pressure port and a high pressure port, comprising in combination:
   vapor intake means for connecting to the low pressure port of the unit;
   vapor filter means connected to the vapor intake means for filtering refrigerant vapor received from the unit;
   liquid intake means for connecting to the high pressure port of the unit;
   liquid filter means connected to the liquid intake means for filtering liquid refrigerant received from the unit;
   suction compressor means having an outlet and having an inlet in communication with the vapor filter means for withdrawing refrigerant vapor from the unit;
   liquid pump means having an outlet and having an inlet in communication with the liquid filter means for withdrawing liquid refrigerant from the unit;
   a bath of chilled liquid;
   condenser means located in the bath and in communication with the outlet of the suction compressor means for condensing refrigerant vapor flowing from the suction compressor means;
   heat exchanger means located in the bath and in communication with the outlet of the liquid pump means for cooling the liquid refrigerant flowing from the liquid pump means;
   a storage tank having a vapor port in communication with an upper portion of the tank and having a liquid port connected to the condenser means and to the heat exchanger means for storing liquid refrigerant flowing from the condenser means and the heat exchanger means; and
   feedback compressor means having an inlet connected to the vapor port of the storage tank and an outlet connected to the condenser means for withdrawing vapor from the storage tank, pressurizing the vapor and transmitting the pressurized vapor to the condenser means for further condensing.

7. The apparatus according to claim 6 wherein the heat exchanger means comprises a coil of conduit immersed in the bath.

8. The apparatus according to claim 6 wherein the condenser means comprises a parallel flow condenser immersed in the bath.

9. The apparatus according to claim 6, further comprising:
   pressure switch means for monitoring the pressure in the upper portion of the tank;
   a bypass conduit communicating the outlet of the suction compressor means to the inlet of the feedback compressor means; and
   bypass valve means electrically connected to the pressure switch means for directing refrigerant vapor from the outlet of the suction compressor means to the inlet of the feedback compressor means and for closing the vapor port of the tank when the pressure monitored by the pressure switch means is below a selected level, and for directing refrigerant vapor from the outlet of the suction compressor means directly to the condenser means and opening the vapor port of the tank when the pressure monitored by the pressure switch reaches the selected level.

10. The apparatus according to claim 6, further comprising:

drawdown means connected to the liquid port of the tank and actuable when substantially all of the refrigerant vapor and liquid refrigerant have been withdrawn from the unit, for blocking flow into the liquid port of the tank and for connecting outlets of the condenser means and the heat exchanger means directly to the inlet of the feedback compressor means to drawdown any remaining vapor in the apparatus, and for connecting the outlet of the feedback compressor means directly to the vapor port of the tank, bypassing the condenser means, for transmitting the vapor drawdown to the upper portion of the tank.

11. The apparatus according to claim 6, further comprising:

a suction drawdown conduit connected from the liquid port of the tank to the inlet of the feedback compressor means;

suction drawdown valve means for closing the suction drawdown conduit until substantially all of the refrigerant vapor and liquid refrigerant have been withdrawn from the unit, and for then closing the liquid port of the tank and opening the suction drawdown conduit to direct residual refrigerant vapor in the apparatus to the inlet of the feedback compressor means;

a pressure drawdown conduit connected from the outlet of the feedback compressor means to the vapor port of the tank; and pressure drawdown valve means for closing the pressure drawdown conduit until the suction drawdown valve means opens the suction drawdown conduit, and for then opening the pressure drawdown conduit to direct the output of the feedback compressor means into the vapor port of the tank.

12. The apparatus according to claim 6 wherein the suction compressor means and liquid pump means are located in an assembly remote from the bath, tank, and feedback compressor means.

13. The apparatus according to claim 6 further comprising:

a precooler heat exchanger connected between the suction compressor means and the condenser means for preliminarily cooling the refrigerant vapor.

14. A method for recovering refrigerant from a unit which utilizes refrigerant and has a low pressure port and a high pressure port, comprising:

connecting a suction compressor to the low pressure port of the unit and compressing the refrigerant vapor received;

connecting a liquid pump to the high pressure port of the unit and pumping the liquid refrigerant received;

immersing a condenser in a bath of chilled liquid;

connecting the condenser to an outlet of the suction compressor and condensing refrigerant vapor flowing from the suction compressor;

immersing a heat exchanger in the bath;

connecting the heat exchanger to an outlet of the liquid pump and cooling the liquid refrigerant flowing from the liquid pump; and providing a storage tank and connecting a liquid port of the storage tank to the condenser and to the heat exchanger for storing liquid refrigerant.

15. The method according to claim 14, further comprising:

providing a vapor port in an upper portion of the tank; and feeding back refrigerant vapor collecting in the upper portion of the tank through the vapor port to the condenser and further condensing the refrigerant vapor.

16. The method according to claim 14, further comprising:

providing a vapor port in an upper portion of the tank;

connecting a feedback compressor to the vapor port and to the condenser; and withdrawing refrigerant vapor collected in the upper portion of the tank through the vapor port to the feedback compressor, compressing the refrigerant vapor with the feedback compressor, and transmitting the compressed refrigerant vapor to the condenser and further condensing the refrigerant vapor.

17. The method according to claim 16, further comprising:

providing a vapor port in an upper portion of the tank;

connecting a feedback compressor to the vapor port and to the condenser;

monitoring the pressure in the upper portion of the tank;

withdrawing refrigerant vapor collected in the upper portion of the tank through the vapor port to the feedback compressor only when the pressure monitored in the upper portion of the tank reaches a selected level, compressing the refrigerant vapor with the feedback compressor, and transmitting the compressed refrigerant vapor to the condenser and further condensing the refrigerant vapor.

18. The method according to claim 14, further comprising:

providing a vapor port in an upper portion of the tank;

connecting a feedback compressor to the vapor port and to the condenser;

providing a bypass conduit from the outlet of the suction compressor to an inlet of the feedback compressor;

monitoring the pressure in the upper portion of the tank;

if the pressure monitored in the tank is below a selected level, directing the refrigerant flowing from the outlet of the suction compressor through the bypass conduit to the inlet of the feedback compressor; and if the pressure monitored in the tank is above the selected level, closing the bypass conduit, withdrawing refrigerant vapor collected in the upper portion of the tank through the vapor port to the feedback compressor, compressing the refrigerant vapor with the feedback compressor, and transmitting the compressed refrigerant vapor to the condenser and further condensing the refrigerant vapor.

19. The method according to claim 14, further comprising:

providing a vapor port in an upper portion of the tank;

connecting a feedback compressor to the vapor port and to the condenser;

withdrawing refrigerant vapor collected in the upper portion of the tank through the vapor port to the feedback compressor, compressing the refrigerant vapor with the feedback compressor, and transmitting the compressed refrigerant vapor to the condenser and further condensing the refrigerant vapor; and when substantially all of the refrigerant vapor and liquid refrigerant have been withdrawn from the unit:

blocking flow into the tank from the condenser and the heat exchanger, connecting outlets of the condenser and the heat exchanger directly to the feedback compressor, drawing down any remaining vapor with the feedback compressor; and connecting an outlet of the feedback compressor directly to the vapor port of the tank, bypassing the condenser, and transmitting the vapor drawdown to the upper portion of the tank.

* * * * *